3,076,832
ORGANIC MERCURY COMPOUNDS
Herbert C. Stecker, 113 Hollywood Ave., Hohokus, N.J.
No Drawing. Filed Sept. 9, 1958, Ser. No. 759,845
5 Claims. (Cl. 260—431)

This invention deals with new organic compounds of mercury, useful as fungicides and bactericides for non-therapeutic uses in the preservation of materials other than foods, and the like. These novel compounds comprise condensation products of aliphatic substituted unsaturated hydrocarbons containing a labile negative group, said unsaturated compounds reacting with a divalent inorganic mercury compound, and with a compound containing at least one active hydrogen atom attached to a non-acid polar atom.

Freidlina, Nesmeyanov and Tokareva in Berichte, 698, 2019–21 (1936), mention that hydrobromic acid completely destroys HO—C$_2$H$_4$—HgCH$_2$Br. They, furthermore, state that ethylene dibromide will not form an organic compound with mercury. Also, Whitmore's "Organic Compounds of Mercury" (1921), p. 32, states that, although ethylene forms an organic compound with a mercury salt in the presence of water or alcohol, the addition of alkyl halide or hydrochloric acid yields a quantitative amount of ethylene by decomposition of the product. Such statements no doubt have discouraged many investigators against trying out reactions of this type with the purpose of producing high yields of relatively stable products. In the novel reactions discussed herein, it has been considered surprising that the addition of hydrochloric or other inorganic acid does not decompose the products formed, but merely forms the salt of the acid.

Also, it has been discovered that organic halides, instead of decomposing the reaction product, actually enter the reaction to form fairly stable organic compounds. Formation of thioethers through use of reagents such as 2-mercaptoethanol in the reaction medium of the present invention also is surprising in that it is well-known that inorganic and organic mercury salts react readily with —SH groups to form the highly insoluble sulfur products or to reduce the organic compound to metallic mercury.

According to the present invention, allyl chloride, for example, may be reacted with mercuric oxide in the presence of acetic acid and methyl alcohol to produce 3-chloro-2-methoxypropyl-mercuric acetate in an essentially quantitative yield. Similarly, propargyl chloride may be substituted for allyl chloride, stearic acid for acetic acid, and ethylene glycol for methyl alcohol, to produce high yields of sym.-ethylene bis - (3 - chloro - 2-oxy-propenyl mercuric stearate).

Similarly, mercuric malonate, allyl isothiocyanate and isopropyl alcohol may be reacted to produce the compound designated as:

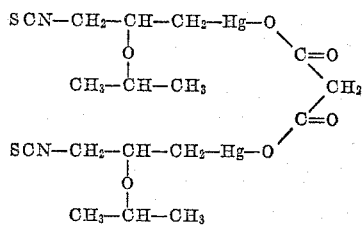

Likewise, mercuric oxide, acetic acid, propargyl chloride and diethanolamine may be reacted to form:

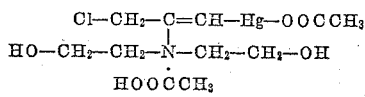

which, when reacted with hydrochloric acid, forms the organo-mercuric chloride hydrochloride.

Also, the mercuric salt of monoethyl phosphate, 2-chloroethylvinyl ether and ethyl-2-mercaptoacetate may be combined to form:

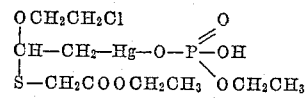

Further, mercuric trichloracetate, methallyl thiocyanate and phosphine, may be reacted similarly to produce a disubstituted phosphine:

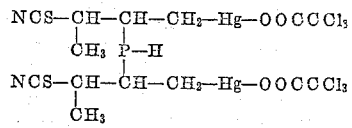

And, mercuric oxide, sodium terephthalate (hemi salt), allyl isocyanate and dimethyl arsine may be reacted to yield:

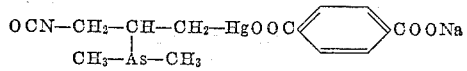

The aliphatic unsaturated hydrocarbons forming one of the reacting ingredients in the formation of the present novel compounds must contain a labile substituent group, such as halogen. For example, as pointed out by Bernthsen in his "Textbook of Organic Chemistry," Sudborough Edition, D. Van Nostrand Co., 1927, page 58, halogen substituents, e.g., chlorine, bromine, iodine and fluorine, are labile or readily-replaceable groups. Other such groups found suitable for the purposes of the present invention are SCN, CNS, OCN and CNO groups. Although one such labile group is generally used, more than one, and up to twenty of such groups may be employed. The aforesaid reacting compound may contain other substituents, such as other halogens, ether linkages, and the like, which do not enter into the reaction involved herein, and provided such groups do not interfere with the aforesaid reaction by steric hindrance, excessive weakening of the unsaturated bond, or otherwise. Compounds of this type found suitable for this purpose in the reaction set forth herein include allyl chloride, propargyl bromide, oleyl iodide, allyl thiocyanate, allyl isothiocyanate, and the like. It is preferred that such unsaturated reactants have 2 to 30 carbon atoms per molecule, although the most desirable ones at the present time have 2 to 10 carbon atoms per molecule. These latter compounds may be straight chain or branched, provided the unsaturation is in reactive form.

The next ingredient in the novel reaction of the present invention is a divalent mercury compound carrying anions, such as mercuric acetate, mercuric stearate, mercuric bromide, mercuric chloride, mercuric hydroxyacetate, mercuric propionate, and the like. These mercury compounds may be formed in situ during the reaction, by use of mercuric oxide (HgO), using the appropriate anion-forming acid, such as acetic, propionic, hydroxy acetic, and like acid, it being understood that the acid employed would not make the mercury unreactive or too slowly reactive for the purpose of the present invention. The in situ formation of the mercury compound is often more preferable as it aids in controlling the extent of the reaction, as will be hereinafter explained.

The final ingredient in the reaction mixture of the present invention is an active-hydrogen compound wherein at least one active hydrogen is present, said active hydrogen being attached to a non-acid polar atom, namely, oxygen, and/or sulphur. The term "non-acid" signifies that the atom must not come from the acid portion of a molecule, such as the oxygen carrying the hydrogen in the radical —COOH. As pointed out by Whitmore in his "Organic Chemistry," Van Nostrand, 1937, page 517, such active hydrogen compounds include water, and alcohols. Other such suitable compounds for the present reaction include mercaptans. Suitable compounds of this type include methanol, ethanol, propanols, chlorethanol, hydroxyacetic acid, ethylene glycol, sorbitol, triethanolamine, diethanolamine, monethanolamine, pentaerythritol, glycerol, 2-amino-2-ethyl-3-propanediol, acetone (enol form), amines sold under the "Ethomeen" brand, exemplified by $C_{12}H_{25}NH(C_2H_4O)_4C_2H_4OH$, heptyl mercaptan, high molecular weight condensates of dehydroabietylamine with ethylene oxide, such as

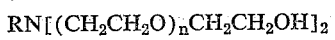

wherein R may be an alkyl group, high molecular weight polyhydroxy ether compounds, and the like. In the event more than one active hydrogen atom are present in the compound reacting, it is not necessary that all of the active hydrogens enter into reaction, unless this is desired.

The novel compounds produced by this reaction may be classified generically according to the formula:

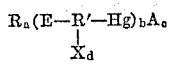

where R represents the residue of the active-hydrogen compound, other than a bare compound, remaining in the novel compound after the reaction minus the element to which the active-hydrogen was attached, E represents the non-acidic polar element to which the active hydrogen was attached, A represents the anion, Hg represents mercury, X represents the labile negative group attached to R′, R′ represents a hydrocarbon group having 2 to 30 carbon atoms, $a$ is an integer ranging from one to twice the maximum reacting valence of A, $b$ represents an integer ranging from 1 to 100, $c$ represents the ratio obtained by dividing $b$ by the reacting valence of A, and $d$ represents an integer ranging from 1 to 20.

The integer $a$ may have a value up to twice the maximum reacting valence of A. For example, when

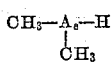

is employed as a reactant, R becomes $CH_3$, and thus there are two $CH_3$ residues present. The term "maximum reacting valence of A" employed herein designates the highest valence attainable by A. If the reacting valence of A were 1, then $a$ would have a value of 2. If the reacting valence of A were 2, then $a$ would have a value of 4, since two distinct monovalent organomercuric moieties would be required to satisfy A, and two R's would be required for each of the two moieties. For example, in Table I, Example 41, $b$ has a value of 2, and the reacting valence of $SO_4$ is 2. Hence $c$ is the ratio of the two and would have the value of 1. However, in Example 32, $b$ has the value of 2 and the reacting valence of

is 1. The ratio of both would give a value of 2 to $c$. Also, in Example 23c, where $b$ has a value of 4 and A has a value of 1, $c$ would have a value of 4. This may be further exemplified, using a compound in which R is the pentaerythritol residue with a reaction capacity which would give a value of 4 for $b$ (as in Example 23c). If the acetate ion is replaced by the phosphate ion, and all available reacting valencies entered the reaction, $b$ would have a value of 12, while the reacting valence of A would be 3. Hence $c$ would have a value of 4 as follows:

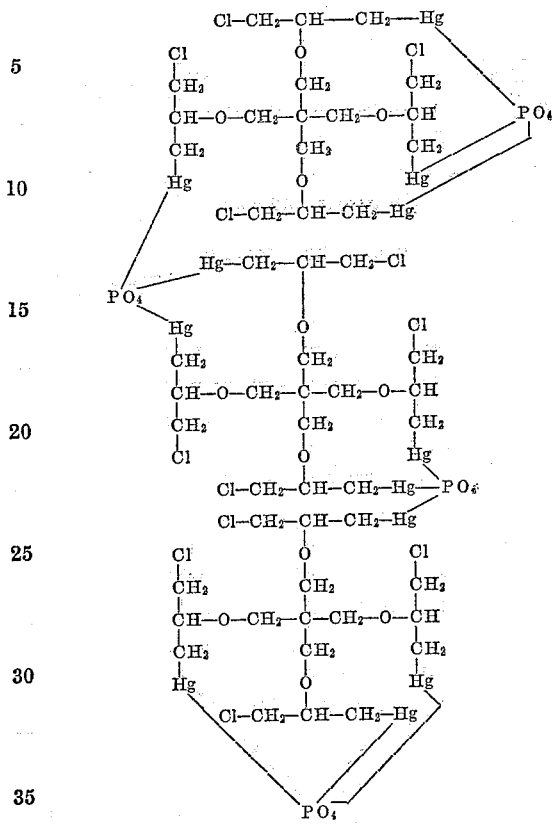

In the case of the allyl chloride-methanol-mercuric acetate reaction already discussed, the reaction may be written as follows:

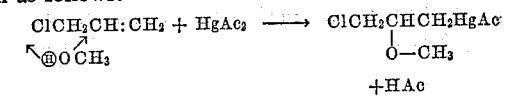

Using the previously indicated symbols, the reaction product may be designated as:

In the case of the complete reaction of allyl chloride, 2-mercaptoethanol and mercuric acetate, for example, the reaction product would be:

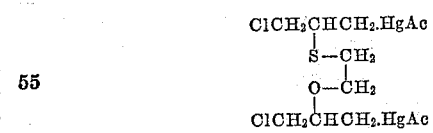

An incomplete reaction in the latter case can involve reaction of the hydroxy group and of the mercapto group, to the extent of their respective reaction rates, in which case the final product would contain more hydroxy-reacted compound, less mercaptan-reacted compound, and some unreacted 2-mercapto-ethanol.

And, in the case of the allyl chloride-pentaerythritol-mercuric phosphate reaction already mentioned, the reaction may be written as follows:

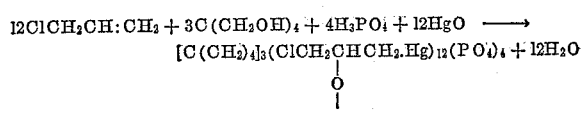

Thus, if we use the letter E to designate oxygen or sulfur to which the reacting reactive-hydrogen atom is attached in the active-hydrogen compound, then we can employ the following formula to designate compounds of the present invention:

$$R_a(E-R'-Hg)_b A_c$$
$$\quad\quad\quad |$$
$$\quad\quad\quad X_d$$

wherein:

E represents a non-acid polar atom selected from the class consisting of oxygen, sulfur, and oxygen and sulfur, X represents a labile negative substituent selected from the class consisting of halogen, SCN, CNS, OCN and CNO, R represents the residual moiety of the active-hydrogen compound, less E and its reacted active-hydrogen atom, R' represents a hydrocarbon group having 2 to 30 carbon atoms, and carrying labile substituent X, Hg represents a mercury atom, A represents an anion salt portion attached to the mercury atom, $c$ represents the ratio obtained by dividing the number of reacting E's in the compound by the valence of A, $a$ represents the ratio obtained by dividing the number of reacting active-hydrogen atoms of the active-hydrogen compound by $c$, $b$ represents the number of reacting E's, and is an integer ranging from 1 to 100, and $d$ represents an integer ranging from 1 to 20.

These novel compounds may be produced simply by mixing a substituted unsaturated hydrocarbon compound with a mercuric salt or with mercuric oxide and an acid corresponding to the salt in the presence of the desired active hydrogen compound, which latter also may be employed in excess as the reaction solvent. There is usually a liberation of heat during the stirring operation, after which the product may be recovered by precipitation, evaporation of the solvent, or by drying from the frozen state. The products formed vary from highly volatile to relatively non-volatile liquids and crystalline or amorphous solids. When using mercuric chloride and other mercury salts which tend to react slowly or incompletely, reaction may be speeded up or brought to completion by occasional addition of alkali or alkaline buffers which maintain an optimum pH range.

As stated previously, although R' has been specified as a hydrocarbon group, it is to be understood that this group may contain one or more substituents which do not enter into the reaction of the present invention and which do not interfere with said reaction by steric hindrance, excessive weakening of the unsaturated bond of the reacting parent substituted unsaturated hydrocarbon, or otherwise. Such substituents may include halogens, ether-linked groups, nitro groups, as well as other known groups.

From the foregoing, it is apparent that when polyhydroxy and/or polysulfhydrated compounds are employed as the active hydrogen compounds, they may be added in less than molar ratios to provide products containing more than one organic mercury moiety linked to the active hydrogen compound residue. In the case of the use of acids such as hydroxyacetic acid, the acid may serve the purpose of being both the active hydrogen compound and the anion.

This invention may be more readily understood by reference to the following examples which depict many phases of the present invention:

EXAMPLE 1

Two moles of allyl chloride, one mole of ethylene glycol, two moles of mercuric oxide and two moles of acetic acid were reacted by adding the mercuric oxide slowly with stirring to the mixture of other compounds in excess acetic acid as solvent.

After 30 minutes (when all mercuric oxide was consumed) the reaction mass was warmed and stirred until no inorganic mercury ions were detectable by the addition of a small test portion to dilute NaOH solution.

The resulting product was found to have the empirical formula $C_{12}H_{20}O_6Hg_2Cl_2$, and was obtained in substantially quantitative yield after stripping off of the solvent. It was identified as:

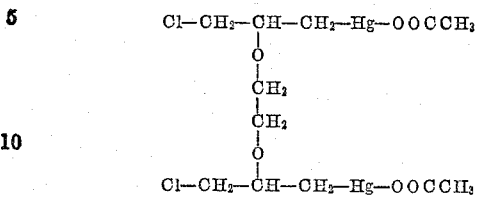

EXAMPLE 2

Two moles of allyl chloride, one mole of triethanolamine, two moles of mercuric oxide, and three moles of acetic acid were reacted in the same manner as in Example 1. When the reaction was completed, the product, diluted with water, was converted to the chloride salt by addition of dilute NaCl solution. The precipitated reaction product was found to have the empirical formula $C_{14}H_{26}O_5Hg_2NCl_4$. It was filtered, washed and dried. It was identified as:

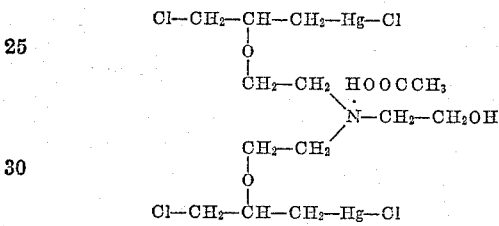

EXAMPLE 3

Three moles of allyl chloride, one mole of triethanolamine, three moles of mercuric oxide and four moles of acetic acid were reacted as in Example 2 and the chloride salt was formed in the same manner. The reaction product was found to have the empirical formula $$C_{17}H_{31}O_5Hg_3NCl_6$$

It was identified as:

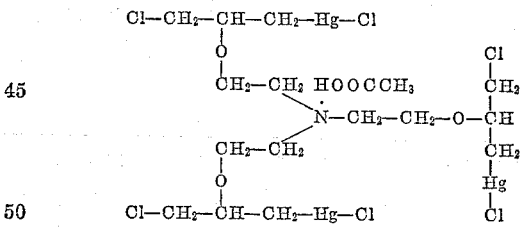

EXAMPLE 4

Four moles of allyl chloride, one mole of pentaerythritol, four moles of mercuric oxide and four moles of acetic acid were reacted as in Example 1 to form one mole of an organic mercury compound containing four chloropropyl mercuric acetate moieties connected with each other through the four active hydroxyl hydrogens of the pentaerythritol. The compound had the empirical formula $C_{25}H_{40}O_{12}Hg_4Cl_4$.

EXAMPLE 5

One mole of allyl isothiocyanate, one mole of methyl alcohol, one mole of mercuric oxide and one mole of acetic acid were reacted as in Example 1, but using an excess of methanol as the reaction solvent. The product obtained was found to be 3-isothiocyano-2-methoxypropyl mercuric acetate having the empirical formula $C_7H_{11}O_3HgNS$.

EXAMPLE 6

One mole of allyl thiocyanate, one mole of methanol, one mole of mercuric oxide, and one mole of acetic acid were reacted as in Example 5 to yield 3-thiocyano-2-methoxy-propyl mercuric acetate having the empirical formula $C_7H_{11}O_3HgNS$.

EXAMPLE 7

To three moles of 3-chloro-2-methoxy-propyl mercuric acetate (made by reacting equimolar quantities of allyl chloride, methanol, mercuric oxide and acetic acid, as in Example 5) was added one mole of a dilute solution of phosphoric acid in methanol, and the by-product acetic acid was removed by distillation, with the excess methanol, under vacuum. The product obtained was tri(3-chloro-2-methoxy-propyl mercuric) phosphate having the empirical formula $C_{12}H_{24}O_7Hg_3PCl_3$.

Although the mercury salt as such may be added slowly to the other reactants in the solvent to prepare the products of the present invention, it has been found that control of the reaction is more easily obtained by addition of mercuric oxide to the other reactants, including the acid reactable with the oxide, and the solvent, as outlined in Example 1.

Biological tests on compounds made in accordance with the present invention have shown that their activity, in relation to phenyl mercury acetate (the present standard of organo-mercury compounds), is, on the average, over 23% greater, i.e., they require 23% less mercury metal by weight in the treating compositions to produce the same biocidal effect, which fact results in a decidedly favorable economic advantage in view of the high cost of mercury. Although the reason for this is not entirely established, it is believed that the high biocidal activity of the compounds of the present invention is attributable in part, at least, to the presence in the molecule of a labile activating atom (e.g., a halogen atom) together with a lipophilic group (e.g., an ether linkage) which, with other concomitant portions of the molecule, enable more effective penetration of the mercury atom through the cell wall of the micro-organism.

Among other advantages of the compounds of the present invention are: Simplicity of manufacture employing less equipment and high yields resulting in lower material costs. Furthermore, molecular structures may be synthesized having characteristics specifically desired for the biocidal problem encountered.

Table I presents a series of compounds prepared in accordance with the present invention, listing the biocidal activity as the percentage of that obtained with PMA (phenyl mercuric acetate). This comparative biological activity was determined by the use of Difco nutrient agar, inoculated with *Staphylococcus aureus* and poured into Petri dish plates. Zones of inhibition were determined in triplicate for each product after a 24-hour incubation period at 3 concentration levels so as to determine points from which a straight line could be drawn on graph paper, plotting zones of inhibition, in millimeters, against concentration in parts per million. By interpolation on this line as determined for each product, a concentration could be found at which the product gave the same zone size as a standard concentration of PMA, and the comparative activity of the particular product could thus be deduced. For example, if PMA at 1000 p.p.m. produced a zone of inhibition measuring 24 mm., and it was found that the same zone size was obtainable with the new compound at 500 p.p.m., then this new product would be considered to be 100% more effective than PMA.

*Table I*

| Ex. No. | Reacting components | Compound formed | Empirical formula | MW | Percent mercury Calc. | Percent mercury Fd. | Ratio to corresponding phenyl Hg salt | Percent activity over that of PMA basis mercury content |
|---|---|---|---|---|---|---|---|---|
| 1 | Allyl chloride, mercuric oxide, hydroxyacetic acid, methanol. | Cl—CH₂—CH(OCH₃)—CH₂—Hg—OOCCH₂OH | $C_6H_{11}O_4HgCl$ | 383 | 52.4 | 52.3 | 1.28 | 31.2 |
| 2 | Propargyl chloride, mercuric acetate, acetic acid, methanol. | Cl—CH₂—C(OCH₃)=CH—Hg—OOCCH₃ | $C_6H_9O_3HgCl$ | 365 | 54.9 | 54.9 | 1.30 | 29.4 |
| 3 | Allyl chloride, mercuric oxide, hydroxyacetic acid. | Cl—CH₂—CH(OCH₂COOH)—CH₂—Hg—OOCCH₂OH | $C_7H_{11}O_6HgCl$ | 427 | 46.9 | 46.8 | 0.80 | 1.7 |
| 4 | Allyl chloride, mercuric oxide, acetic acid, 2-chlorethanol. | Cl—CH₂—CH(OCH₂CH₂Cl)—CH₂—Hg—OOCCH₃ | $C_7H_{12}O_3HgCl_2$ | 416 | 48.2 | 48.2 | 1.26 | 35.9 |
| 5 | Allyl chloride, mercuric oxide, acetic acid, ethylene glycol. | Cl—CH₂—CH(OCH₂CH₂OH)—CH₂—Hg—OOCCH₃ | $C_7H_{13}O_4HgCl$ | 397 | 50.5 | 50.4 | 0.86 | 1.52 |
| 5a | Allyl chloride, mercuric oxide, acetic acid, ethylene glycol. | Cl—CH₂—CH(O—CH₂—CH₂—O—CH₂—CH(Cl)—CH₂—Hg—OOCCH₃)—CH₂—Hg—OOCCH₃ | $C_{12}H_{20}O_6Hg_2Cl_2$ | 732 | 54.9 | 54.8 | 1.31 | 29.7 |
| 6 | Allyl chloride, mercuric chloride, sodium hydroxide, triethanolamine. | Cl—CH₂—CH(OC₂H₄N(C₂H₄OH)₂)—CH₂—Hg—Cl | $C_9H_{19}O_3HgNCl_2$ | 461 | 43.5 | 43.5 | 0.74 | 1.3 |

TABLE I—Continued

| Ex. No. | Reacting components | Compound formed | Empirical formula | MW | Percent mercury Calc. | Percent mercury Fd. | Biological activity Ratio to corresponding phenyl Hg salt | Biological activity Percent activity over that of PMA basis mercury content |
|---|---|---|---|---|---|---|---|---|
| 6a | Allyl chloride, mercuric chloride, sodium hydroxide, triethanolamine. | Cl—CH$_2$—CH—CH$_2$—Hg—Cl<br>　　　　　OCH$_2$CH$_2$<br>　　　　　　　N—C$_2$H$_4$OH<br>　　　　　OCH$_2$CH$_2$<br>Cl—CH$_2$—CH—CH$_2$—Hg—Cl | C$_{12}$H$_{22}$—$_3$Hg$_2$NCl$_4$ | 771 | 52.4 | 52.2 | 0.96 | 8.4 |
| 6b | Allyl chloride, mercuric chloride, sodium hydroxide, triethanolamine. | Triple substitution | C$_{18}$H$_{27}$O$_3$Hg$_3$NCl$_6$ | 1,084 | 55.5 | 55.4 | 1.00 | 6.9 |
| 7 | Allyl chloride, mercuric oxide, acetic acid, nonylphenoxy triethoxy ethanol. | Cl—CH$_2$—CH—CH$_2$—Hg—OOCCH$_3$<br>　　　　　O(C$_2$H$_4$O)$_4$—C$_6$H$_4$—C$_9$H$_{19}$ | C$_{28}$H$_{47}$O$_7$HgCl | 731 | 27.3 | 27.3 | 0.58 | 21.2 |
| 8 | Allyl chloride, mercuric oxide, acetic acid, 2-butoxy ethanol. | Cl—CH$_2$—CH—CH$_2$—Hg—OOCCH$_3$<br>　　　　　OC$_2$H$_4$OC$_4$H$_9$ | C$_{11}$H$_{21}$O$_4$HgCl | 453 | 44.3 | 44.1 | 0.83 | 10.4 |
| 9 | Allyl chloride, mercuric oxide, acetic acid, monomethyl ether of dipropylene glycol. | Cl—CH$_2$—CH—CH$_2$—Hg—OOCCH$_3$<br>　　　　　OC$_3$H$_6$OC$_3$H$_6$OCH$_3$ | C$_{12}$H$_{23}$O$_5$HgCl | 483 | 41.5 | 41.5 | 0.84 | 17.2 |
| 10 | Allyl chloride, mercuric oxide, acetic acid, tetrahydrofurfuryl alcohol. | Cl—CH$_2$—CH—CH$_2$—Hg—OOCCH$_3$<br>　　　　　OCH$_2$C$_4$H$_7$ | C$_{10}$H$_{17}$O$_4$HgCl | 437 | 45.9 | 45.8 | 0.79 | 2.5 |
| 11 | Allyl chloride, mercuric oxide, acetic acid, nonylphenoxy polyethoxy ethanol. | Cl—CH$_2$—CH—CH$_2$—Hg—OOCCH$_3$<br>　　　　　OC$_2$H$_4$(OC$_2$H$_4$)$_{8½}$O—C$_6$H$_4$—C$_9$H$_{19}$ | C$_{39}$H$_{69}$O$_{12½}$HgCl | 973 | 20.6 | 20.6 | 0.41 | 15.8 |
| 12 | Allyl chloride, mercuric oxide, acetic acid, polypropylene glycol. | Cl—CH$_2$—CH—CH$_2$—Hg—OOCCH$_3$<br>　　　　　OC$_3$H$_6$(OC$_3$H$_6$)$_{11}$OC$_3$H$_6$OH | C$_{44}$H$_{87}$O$_{16}$HgCl | 1,107 | 18.1 | 18.0 | 0.40 | 24.0 |
| 12a | Allyl chloride, mercuric oxide, acetic acid, polypropylene glycol. | Cl—CH$_2$—CH—CH$_2$—Hg—OOCCH$_3$<br>　　　　　O—C$_3$H$_6$(OC$_3$H$_6$)$_{11}$OC$_3$H$_6$O<br>Cl—CH$_2$—CH—CH$_2$—Hg—OOCCH$_3$ | C$_{49}$H$_{94}$O$_{16}$Hg$_2$Cl$_2$ | 1,442 | 27.8 | 27.6 | 0.52 | 10.4 |
| 13 | Allyl chloride, mercuric oxide, acetic acid, 3-hydroxy-2-ethylhexanol. | Cl—CH$_2$—CH—CH$_2$—Hg—OOCCH$_3$<br>　　　　　O—CH$_2$—CH—CHOHC$_3$H$_7$<br>　　　　　　　　　C$_2$H$_5$ | C$_{13}$H$_{25}$O$_4$HgCl | 481 | 41.7 | 41.6 | 0.77 | 9.1 |
| 13a | Allyl chloride, mercuric oxide, acetic acid 3-hydroxy-2-ethylhexanol. | Cl—CH$_2$—CH—CH$_2$—Hg—OOCCH$_3$<br>　　　　　　　　　C$_2$H$_5$<br>　　　　　C—CH$_2$—CH—CH—C$_3$H$_7$<br>　　　　　　　　—O—<br>Cl—CH$_2$—CH—CH$_2$—Hg—OOCCH$_3$ | C$_{18}$H$_{32}$O$_6$Hg$_2$Cl$_2$ | 816 | 49.2 | 49.0 | 0.86 | 4.0 |
| 14 | Allyl chloride, mercuric acetate acetic acid, polyethylene glycol. | Cl—CH$_2$—CH—CH$_2$—Hg—OOCCH$_3$<br>　　　　　O(C$_2$H$_4$O)$_{5+}$C$_2$H$_4$OH | C$_{17}$H$_{33+}$O$_{9+}$HgCl | ¹620 | ¹32.3 | 32.0 | 0.64 | 15.3 |
| 14a | Allyl chloride, mercuric acetate, acetic acid, polyethylene glycol. | Cl—CH$_2$—CH—CH$_2$—Hg—OOCCH$_3$<br>　　　　　O(C$_2$H$_4$O)$_{5+}$C$_2$H$_4$O<br>Cl—CH$_2$—CH—CH$_2$—Hg—OOCCH$_3$ | C$_{22+}$H$_{40+}$O$_{11+}$Hg$_2$Cl$_2$ | ¹960 | ¹41.8 | 42.0 | 0.85 | 17.5 |

TABLE I—Continued

| Ex. No. | Reacting components | Compound formed | Empirical formula | MW | Percent mercury Calc. | Percent mercury Fd. | Biological activity Ratio to corresponding phenyl Hg salt | Biological activity Percent activity over that of PMA basis mercury content |
|---|---|---|---|---|---|---|---|---|
| 15 | Allyl chloride, mercuric acetate, monoethyl ether of ethylene glycol | Cl—CH$_2$—CH—CH$_2$—Hg—OOCCH$_3$<br>　　　　　$\|$<br>　　　　　OC$_2$H$_4$OC$_2$H$_5$ | C$_9$H$_{17}$O$_4$HgCl | 425 | 47.2 | 47.0 | 0.90 | 12.1 |
| 16 | Allyl chloride, mercuric acetate, α-terpineol. | Cl—CH$_2$—CH—CH$_2$—Hg—OOCCH$_3$<br>　　　　　$\|$<br>　　　　　OC$_{10}$H$_{17}$ | C$_{15}$H$_{25}$O$_3$HgCl | 489 | 41.0 | 41.0 | 0.82 | 16.1 |
| 17 | Allyl chloride, mercuric oxide, acetic acid, hydroxyethyl ethylene diamine. | Cl—CH$_2$—CH—CH$_2$—Hg—OOCCH$_3$<br>　　　　　$\|$<br>　　　　　OC$_2$H$_4$NHC$_2$H$_4$NH$_2$HAc<br>　　　　　$\|$<br>　　　　　HOOCCH$_3$ | C$_{11}$H$_{23}$O$_6$HgN$_2$Cl | 499 | 40.2 | 40.1 | 0.70 | 3.5 |
| 18 | Allyl chloride, mercuric oxide, acetic acid, diethanolamine. | Cl—CH$_2$—CH—CH$_2$—Hg—OOCH$_3$<br>　　　　　$\|$<br>　　　　　OC$_2$H$_4$NHC$_2$H$_4$OH<br>　　　　　$\|$<br>　　　　　HOOCCH$_3$ | C$_9$H$_{18}$O$_4$HgNCl | 440 | 45.6 | 45.6 | 0.88 | 12.8 |
| 18a | allyl chloride, mercuric oxide, acetic acid, diethanolamine. | Cl—CH$_2$—CH—CH$_2$—Hg—OOCCH$_3$<br>　　　　　$\|$<br>　　　　　OC$_2$H$_4$——NH—HOOCCH$_3$<br>　　　　　$\|$<br>　　　　　O—C$_2$H$_4$<br>　　　　　$\|$<br>Cl—CH$_2$—CH—CH$_2$—Hg—OOCCH$_3$ | C$_{14}$H$_{25}$O$_6$Hg$_2$NCl$_2$ | 775 | 51.9 | 51.8 | 0.96 | 9.4 |
| 19 | Allyl chloride, mercuric chloride, sodium hydroxide, amino poly ethylene glycol. | Cl—CH$_2$—CH—CH$_2$—Hg—Cl<br>　　　　　$\|$<br>　　　　　O(C$_2$H$_4$O)$_3$C$_2$H$_4$NH$_2$HCl | C$_{11}$H$_{24}$O$_4$HgNCl$_3$ | 541 | 37.1 | 37.1 | 0.65 | 4.2 |
| 20 | Allyl chloride, mercuric oxide, acetic acid, glycolonitrile. | Cl—CH$_2$—CH—CH$_2$—Hg—OOCCH$_3$<br>　　　　　$\|$<br>　　　　　OCH$_2$CN | C$_7$H$_{10}$O$_3$HgNCl | 392 | 51.2 | 51.2 | 1.06 | 18.8 |
| 21 | Allyl chloride, mercuric oxide, acetic acid, Ethomeen C-15 (Armour). | Cl—CH$_2$—CH—CH$_2$—Hg—OOCCH$_3$<br>　　　　　$\|$<br>　　　　　O(C$_2$H$_4$O)$_4$C$_2$H$_4$NH(CH$_2$)$_{11}$CH$_3$<br>　　　　　$\|$<br>　　　　　HAc | C$_{29}$H$_{58}$O$_9$HgNCl | 800 | 25.1 | 25.0 | 0.58 | 27.4 |
| 22 | Allyl chloride, mercuric oxide, acetic acid, diethylene glycol, chlorohydrin. | Cl—CH$_2$—CH—CH$_2$—Hg—OOCCH$_3$<br>　　　　　$\|$<br>　　　　　OC$_2$H$_4$OC$_2$H$_4$Cl | C$_9$H$_{16}$O$_4$HgCl$_2$ | 460 | 43.6 | 43.6 | 0.73 | 0 |
| 23 | Allyl chloride, mercuric oxide, acetic acid, pentaerythritol. | Cl—CH$_2$—CH—CH$_2$—Hg—OOCCH$_3$<br>　　　　　$\|$<br>　　　　　OCH$_2$C(CH$_2$OH)$_3$ | C$_{10}$H$_{19}$O$_6$HgCl | 471 | 42.6 | 42.0 | 0.71 | −0.4 |
| 23a | Allyl chloride, mercuric oxide, acetic acid, pentaerythritol. | Cl—CH$_2$—CH—CH$_2$—Hg—OOCCH$_3$<br>　　　　　$\|$<br>　　　　　OCH$_2$<br>　　　　　　　$\|$<br>　　　　　　　C(CH$_2$OH)$_2$<br>　　　　　　　$\|$<br>　　　　　OCH$_2$<br>　　　　　$\|$<br>Cl—CH$_2$—CH—CH$_2$—Hg—OOCCH$_3$ | C$_{15}$H$_{28}$O$_8$Hg$_2$Cl$_2$ | 806 | 49.8 | 49.7 | 0.92 | 9.25 |
| 23b | Allyl chloride, mercuric oxide, acetic acid, pentaerythritol. | Triple substitution | C$_{20}$H$_{33}$O$_{10}$Hg$_3$Cl$_2$ | 1,141 | 52.8 | 52.6 | 1.26 | 29∞ |
| 23c | Allyl chloride, mercuric oxide, acetic acid, pentaerythritol. | Quadruple substitution | C$_{25}$H$_{40}$O$_{12}$Hg$_4$Cl$_4$ | 1,476 | 54.4 | 54.4 | 1.25 | 27.0 |
| 24 | Allyl chloride, mercuric oxide, propionic acid, diethylene glycol. | Cl—CH$_2$—CH—CH$_2$—Hg—OOCCH$_2$CH$_3$<br>　　　　　$\|$<br>　　　　　OC$_2$H$_4$OC$_2$H$_4$OH | C$_{10}$H$_{19}$O$_5$HgCl | 455 | 44.1 | 44.0 | 0.78 | 5.2 |
| 24a | Allyl chloride, mercuric oxide, propionic acid, diethylene glycol. | Cl—CH$_2$—CH—CH$_2$—Hg—OOCCH$_2$CH$_3$<br>　　　　　$\|$<br>　　　　　OC$_2$H$_4$OC$_2$H$_4$O<br>　　　　　　　　　　　　　$\|$<br>　　　　　Cl—CH$_2$—CH—CH$_2$—Hg—OOCCH$_2$CH$_3$ | C$_{16}$H$_{28}$O$_7$Hg$_2$Cl$_2$ | 804 | 49.9 | 50.0 | 0.95 | 11.9 |

TABLE I—Continued

| Ex. No. | Reacting components | Compound formed | Empirical formula | MW | Percent mercury Calc. | Percent mercury Fd. | Biological activity Ratio to corresponding phenyl Hg salt | Biological activity Percent activity over that of PMA basis mercury content |
|---|---|---|---|---|---|---|---|---|
| 25 | Allyl chloride, mercuric oxide, propionic acid, tridecyl alcohol. | Cl—CH$_2$—CH—CH$_2$—Hg—OOCCH$_2$CH$_3$<br>        OC$_{13}$H$_{27}$ | C$_{19}$H$_{37}$O$_3$HgCl | 549 | 36.6 | 36.5 | 0.64 | 4.0 |
| 26 | Allyl chloride, mercuric oxide, propionic acid, lactonitrile. | Cl—CH$_2$—CH—CH$_2$—Hg—OOCCH$_2$CH$_3$<br>        OCH(CH$_3$)CN | C$_9$H$_{14}$O$_3$HgNCl | 420 | 47.8 | 47.7 | 1.06 | 24.4 |
| 27 | Allyl chloride, mercuric oxide, propionic acid, 2-mercaptoethanol. | Cl—CH$_2$—CH—CH$_2$—Hg—OOCCH$_2$CH$_3$<br>        O—CH$_2$CH$_2$SH | C$_8$H$_{15}$O$_3$HgSCl | 427 | 47.0 | 47.0 | 0.83 | 5.2 |
| 27a | Allyl chloride, mercuric oxide, propionic acid, 2-mercaptoethanol. | Cl—CH$_2$—CH—CH$_2$—Hg—OOCCH$_2$CH$_3$<br>        OC$_2$H$_4$S<br>Cl—CH$_2$—CH—CH$_2$—Hg—OOCCH$_2$CH$_3$ | C$_{14}$H$_{24}$O$_6$Hg$_2$SCl$_2$ | 776 | 51.7 | 51.7 | 1.15 | 24.5 |
| 28 | Allyl chloride, mercuric oxide, propionic acid, 2-ethyl hexanol. | Cl—CH$_2$—CH—CH$_2$—Hg—OOCCH$_2$CH$_3$<br>        OCH$_2$CHC$_4$H$_9$<br>               C$_2$H$_5$ | C$_{14}$H$_{27}$O$_3$HgCl | 479 | 41.9 | 41.8 | 0.71 | 0 |
| 29 | Allyl chloride, mercuric oxide, propionic acid, tris(hydroxymethyl)nitromethane. | C—CH$_2$—CH—CH$_2$—Hg—OOCCH$_2$CH$_3$<br>        OCH$_2$—C(CH$_2$OH)$_2$<br>               NO$_2$ | C$_{10}$H$_{18}$O$_7$HgNCl | 500 | 40.1 | 40.0 | 0.76 | 11.6 |
| 30 | Allyl isothiocyanate, mercuric oxide, acetic acid, methanol. | SCN—CH$_2$—CH—CH$_2$—Hg—OOCCH$_3$<br>        OCH$_3$ | C$_7$H$_{11}$O$_3$HgNS | 390 | 51.5 | 51.5 | 1.07 | 19.3 |
| 31 | Methallyl chloride, mercuric oxide, acetic acid, methanol. | Cl—CH—CH—CH$_2$—Hg—OOCCH$_3$<br>    CH$_3$  OCH$_3$ | C$_7$H$_{13}$O$_3$HgCl | 381 | 52.6 | 52.6 | 1.04 | 15.1 |
| 32 | 2-chloroethylvinyl ether, mercuric oxide, acetic acid, methanol. | CH$_3$—O—CH—CH$_2$—Hg—OOCCH$_3$<br>        O—C$_2$H$_4$Cl | C$_7$H$_{13}$O$_4$HgCl | 397 | 50.5 | 50.4 | 0.86 | 1.34 |
| 33 | Vinylidene chloride, mercuric oxide, acetic acid, methanol. | Cl$_2$=C—CH$_2$—Hg—OOCCH$_3$<br>        OCH$_3$ | C$_5$H$_8$O$_3$HgCl$_2$ | 387 | 51.5 | 51.4 | 2.41 | 67.50 |
| 34 | Vinyl chloride, mercuric oxide, acetic acid, methanol. | Cl—CH—CH$_2$—Hg—OOCCH$_3$<br>     OCH$_3$ | C$_5$H$_9$O$_3$HgCl | 353 | 56.8 | 56.8 | 1.67 | 42.9 |
| 35 | Vinyl bromide, mercuric oxide, acetic acid, methanol. | Br—CH—CH$_2$—Hg—OOCCH$_3$<br>     OCH$_3$ | C$_5$H$_9$O$_3$HgBr | 398 | 50.4 | 50.4 | 1.67 | 49.7 |
| 36 | Allyl thiocyanate, mercuric oxide, acetic acid, methanol. | NCS—CH$_2$—CH—CH$_2$—Hg—OOCCH$_3$<br>        OCH$_3$ | C$_7$H$_{11}$O$_3$HgNS | 390 | 51.5 | 51.3 | 1.28 | 32.0 |
| 37 | Oleyl chloride, mercuric oxide, acetic acid, methanol. | Cl—(CH$_2$)$_8$—CH——CH—Hg—OOCCH$_3$<br>             OCH$_3$ (CH$_2$)$_7$ | C$_{20}$H$_{39}$O$_3$HgCl | 560 | 35.8 | 35.6 | 0.61 | 1.5 |
| 38 | Allyl iodide, mercuric acetate, nonoic acid, methanol. | I—CH$_2$—CH—CH$_2$—Hg—OOC(CH$_2$)$_7$CH$_3$<br>        OCH$_3$ | C$_{13}$H$_{25}$O$_3$HgI | 556 | 36.1 | 36.1 | 1.28 | 52.9 |
| 39 | Allyl chloride, mercuric oxide, phosphoric acid, methanol. | Cl—CH$_2$—CH—CH$_2$—Hg—H$_2$PO$_4$<br>        OCH$_3$ | C$_4$H$_{10}$O$_5$HgPCl | 385 | 52.1 | 52.0 | 1.28 | 31.8 |
| 40 | Allyl chloride, mercuric oxide, phosphoric acid, methanol. | Triple substitution—PO$_4$ | C$_{12}$H$_{24}$O$_7$Hg$_3$PCl$_3$ | 1,019 | 59.1 | 59.0 | 1.28 | 22.5 |

TABLE I—Continued

| Ex. No. | Reacting components | Compound formed | Empirical formula | MW | Percent mercury Calc. | Percent mercury Fd. | Ratio to corresponding phenyl Hg salt | Percent activity over that of PMA basis mercury content |
|---|---|---|---|---|---|---|---|---|
| 41 | Allyl chloride, mercuric acetate, sulfuric acid, methanol. | $Cl-CH_2-CH-CH_2-Hg-SO_4$<br>$\quad\quad\quad\quad\mid$<br>$\quad\quad\quad\quad OCH_3$<br>$\quad\quad\quad\quad\quad\quad\quad\quad\mid$<br>$Cl-CH_2-CH-CH_2-Hg$<br>$\quad\quad\quad\quad\mid$<br>$\quad\quad\quad\quad OCH_3$ | $C_6H_{16}O_6Hg_2SCl_2$ | 712 | 56.3 | 56.1 | 1.28 | 26.2 |
| 42 | Allyl chloride, mercuric acetate, boric acid, methanol. | $Cl-CH_2-CH-CH_2-Hg-H_2BO_3$<br>$\quad\quad\quad\quad\mid$<br>$\quad\quad\quad\quad OCH_3$ | $C_4H_{10}O_4HgBCl$ | 369 | 54.4 | 54.3 | 1.28 | 28.8 |
| 43 | Allyl chloride, mercuric acetate, sodium sulfide, methanol. | $Cl-CH_2-CH-CH_2-Hg$<br>$\quad\quad\quad\quad\mid\quad\quad\quad\quad\backslash$<br>$\quad\quad\quad\quad OCH_3\quad\quad S$<br>$\quad\quad\quad\quad\quad\quad\quad\quad/$<br>$Cl-CH_2-CH-CH_2-Hg$<br>$\quad\quad\quad\quad\mid$<br>$\quad\quad\quad\quad OCH_3$ | $C_8H_{16}O_2Hg_2SCl_2$ | 612 | 65.5 | 65.1 | 1.28 | 14.5 |
| 44 | Allyl chloride, mercuric oxide, acetic acid, acetone. | $Cl-CH_2-CH-CH_2-Hg-OOCCH_3$<br>$\quad\quad\quad\quad\mid$<br>$\quad\quad\quad\quad O$<br>$\quad\quad\quad\quad\mid$<br>$\quad\quad CH_2=C-CH_3$ } Assumed structure | $C_8H_{13}O_3HgCl$ | 393 | 51.0 | 49.9 | 1.30 | 32.4 |
| 45 | Allyl chloride, mercuric oxide, acetic acid, isopropanol. | $Cl-CH_2-CH-CH_2-Hg-OOCCH_3$<br>$\quad\quad\quad\quad\mid$<br>$\quad\quad\quad\quad O$<br>$\quad\quad\quad\quad\mid$<br>$\quad\quad CH_3-CH-CH_3$ | $C_8H_{14}O_3HgCl$ | 394 | 51.0 | 50.9 | 1.30 | 32.4 |
| 46 | Allyl isothiocyanate, mercuric acetate, malonic acid, isopropanol. | $SCN-CH_2-CH-CH_2-Hg-O\quad\quad O$<br>$\quad\quad\quad\quad\quad\mid\quad\quad\quad\quad\quad\backslash\quad\parallel$<br>$\quad\quad\quad\quad\quad O\quad\quad\quad\quad\quad\quad C$<br>$\quad\quad\quad\quad\quad\mid\quad\quad\quad\quad\quad\quad\mid$<br>$\quad\quad CH_3-CH-CH_3\quad\quad CH_2$<br>$\quad\quad\quad\quad\quad\quad\quad\quad\quad\quad\quad\quad\mid$<br>$\quad\quad\quad\quad\quad\quad\quad\quad\quad\quad\quad\quad C$<br>$\quad\quad\quad\quad\quad\quad\quad\quad\quad\quad\quad/\quad\parallel$<br>$SCN-CH_2-CH-CH_2-Hg-O\quad\quad O$<br>$\quad\quad\quad\quad\quad\mid$<br>$\quad\quad\quad\quad\quad O$<br>$\quad\quad\quad\quad\quad\mid$<br>$\quad\quad CH_3-CH-CH_3$ | $C_{17}H_{26}O_6Hg_2S_2N_2$ | 819 | 48.9 | 50.0 | 1.31 | 36.3 |
| 47 | Allyl isocyanate, mercuric acetate, sodium terephthalate (hemi salt) dimethyl arsine. | $OCN-CH_2-CH-CH_2-Hg-OOC$ 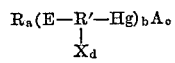 $COONa$<br>$\quad\quad\quad\quad\quad\mid$<br>$\quad\quad CH_3-As-CH_3$ | $C_{14}H_{15}O_5HgNAsNa$ | 586 | 34.2 | 34.1 | 0.72 | 19.5 |
| 48 | Perchlorododecyl vinyl ether, mercuric oxide, acetic acid, methanol. | $\quad\quad OCH_3$<br>$\quad\quad\quad\mid$<br>$H-C-CH_2-Hg-OOCCH_3$<br>$\quad\quad\mid$<br>$\quad\quad O-C_{12}H_5Cl_{20}$ | $C_{17}H_{14}O_4HgCl_{20}$ | 1,193 | 16.5 | 16.3 | 0.43 | 27.3 |

[1] Ca.

I claim:
1. An organic compound reaction product of a mercuric anionic salt, an active-hydrogen compound, and an aliphatic hydrocarbon having an unsaturated bond and at least one labile substituent group, and having the formula:

$$R_a(E-R'-Hg)_b A_c$$
$$\quad\quad\quad |$$
$$\quad\quad\quad X_d$$

wherein:
E represents a non-acid polar atom selected from the class consisting of oxygen, sulfur, and oxygen and sulfur,
X represents a labile negative substituent selected from the class consisting of halogen, SCN, CNS, OCN and CNO,
R represents the residual moiety of the active-hydrogen compound after removal of E and its reacted active-hydrogen atom,
R' represents a hydrocarbon group having 2 to 30 carbon atoms, and carrying labile substituent X,
Hg represents a mercury atom,
A represents an anion salt portion attached to the mercury atom,
c represents the ratio obtained by dividing the number of reacting E's by the valence of A,
a represents the ratio obtained by dividing the number of reacting active-hydrogen atoms of the active-hydrogen compound by c,
b represents the number of reacting E's, and is an integer ranging from 1 to 100, and
d represents an integer ranging from 1 to 20.

2. An organic reaction product according to claim 1 in which R is derived from an organic mercaptan compound.
3. An organic reaction product according to claim 1 in which R is derived from an alcohol.
4. An organic reaction product according to claim 1 in which X is a halogen.
5. An organic reaction product according to claim 1 in which R' is a propylene group.

References Cited in the file of this patent
UNITED STATES PATENTS

| 1,457,675 | Schoeller | June 5, 1923 |
| 2,284,067 | Ralston et al. | May 26, 1942 |
| 2,289,590 | Ralston et al. | July 14, 1942 |